United States Patent
Tanigawa et al.

(10) Patent No.: US 9,688,508 B2
(45) Date of Patent: Jun. 27, 2017

(54) FILAMENT WINDING METHOD AND APPARATUS, AND TANK

(71) Applicant: MURATA MACHINERY, LTD., Kyoto-shi, Kyoto (JP)

(72) Inventors: Motohiro Tanigawa, Kyoto (JP); Tadashi Uozumi, Kyoto (JP); Takenori Aiyama, Toyota (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 14/552,073

(22) Filed: Nov. 24, 2014

(65) Prior Publication Data

US 2015/0075702 A1 Mar. 19, 2015

Related U.S. Application Data

(62) Division of application No. 13/420,322, filed on Mar. 14, 2012, now abandoned.

(30) Foreign Application Priority Data

Jun. 10, 2011 (JP) .................................. 2011-130626

(51) Int. Cl.
    B65H 81/02 (2006.01)
    B29C 53/70 (2006.01)
    (Continued)

(52) U.S. Cl.
    CPC ............ *B65H 81/02* (2013.01); *B29C 53/602* (2013.01); *B29C 70/32* (2013.01); *H01M 8/04* (2013.01);
    (Continued)

(58) Field of Classification Search
    USPC .................................. 156/169, 172, 173, 175
    See application file for complete search history.

(56) References Cited

U.S. PATENT DOCUMENTS 2,843,153 A * 7/1958 Young .................. B29C 53/583
                                                138/125
3,282,757 A * 11/1966 Brussee .................. B29C 53/60
                                                156/165
(Continued)

FOREIGN PATENT DOCUMENTS

EP          1958758 A1    8/2008
EP          2135728 A1    12/2009
(Continued)

OTHER PUBLICATIONS

Machine Translation of Japanese Patent 2004-84915, date unknown.*
Extended European Search Report dated Jun. 9, 2016 issued in counterpart European Patent Application No. 12159522.7.

*Primary Examiner* — Jeff Aftergut
(74) *Attorney, Agent, or Firm* — DLA Piper LLP (US)

(57) ABSTRACT

In a filament winding method, while a rotating tank relatively reciprocates in a tank axial direction to a helical winding head, fibers are fed from yarn-feeding sections to the tank. After the tank turns back in the tank axial direction, a large number of fibers are wound around one domed portion and a trunk portion of the tank, and trailing ends of the large number of fibers are located at one end portion of the trunk portion. Then a piece or a small number of fibers are fed from a rotating hoop winding head to the trunk portion, and hoop winding is performed on helical winding layers formed around the trunk portion. Then, at the one end portion of the trunk portion, the large number of fibers pulled from the yarn-feeding sections of the helical winding head are cut off.

1 Claim, 7 Drawing Sheets

| | MOVEMENT | ROTATION |
|---|---|---|
| GAS TANK | FIXED | DISABLED |
| HOOP WINDING HEAD | RIGHTWARD | DISABLED |
| HELICAL WINDING HEAD | FIXED | |

(51) Int. Cl.
  *B29C 70/32*   (2006.01)
  *B29C 53/60*   (2006.01)
  *H01M 8/04*    (2016.01)
  *B29L 31/00*   (2006.01)
  *B29C 53/64*   (2006.01)

(52) U.S. Cl.
  CPC ....... *B29C 53/64* (2013.01); *B29L 2031/7172* (2013.01)

(56) References Cited

U.S. PATENT DOCUMENTS

| | | | |
|---|---|---|---|
| 4,603,084 A * | 7/1986 | Drachenberg | B29C 53/70 156/166 |
| 2002/0139430 A1 | 10/2002 | Amano et al. | |
| 2003/0051795 A1 * | 3/2003 | Burgess | B29C 53/68 156/169 |
| 2008/0197229 A1 * | 8/2008 | Uozumi | B29C 53/66 242/478.2 |

FOREIGN PATENT DOCUMENTS

| | | |
|---|---|---|
| EP | 2151311 A1 | 2/2010 |
| JP | 2004-84915 A * | 3/2004 |
| JP | 2004144172 A | 5/2004 |
| JP | 2004148777 A | 5/2004 |
| JP | 2009066883 A | 4/2009 |
| JP | 2009166434 A | 7/2009 |
| JP | 2009174554 A | 8/2009 |
| JP | 2009191927 A | 8/2009 |
| JP | 2009285973 A | 12/2009 |

* cited by examiner

| | MOVEMENT | ROTATION |
|---|---|---|
| GAS TANK | RIGHTWARD | ENABLED |
| HOOP WINDING HEAD | RIGHTWARD | ENABLED |
| HELICAL WINDING HEAD | FIXED | |

| | MOVEMENT | ROTATION |
|---|---|---|
| GAS TANK | LEFTWARD | ENABLED |
| HOOP WINDING HEAD | LEFTWARD | ENABLED |
| HELICAL WINDING HEAD | FIXED | |

| | MOVEMENT | ROTATION |
|---|---|---|
| GAS TANK | FIXED | DISABLED |
| HOOP WINDING HEAD | RIGHTWARD | ENABLED |
| HELICAL WINDING HEAD | FIXED | |

| | MOVEMENT | ROTATION |
|---|---|---|
| GAS TANK | FIXED | DISABLED |
| HOOP WINDING HEAD | RIGHTWARD | DISABLED |
| HELICAL WINDING HEAD | FIXED | |

FILAMENT WINDING METHOD AND APPARATUS, AND TANK

CROSS-REFERENCE TO RELATED APPLICATIONS

This application is a divisional of U.S. Ser. No. 13/420,322, filed on Mar. 14, 2012, and claims priority under 35 U.S.C. 119 to Japanese Patent Application No. 2011-130626, filed on Jun. 10, 2011, which applications are hereby incorporated by reference in their entireties.

BACKGROUND OF THE INVENTION

1. Field of the Invention

The present invention relates to a filament winding method, a filament winding apparatus and a tank.

2. Description of the Related Art

A fuel cell power system is mounted, for example, in a vehicle or the like, and a gas tank is used as a source of fuel gas supply.

This type of gas tank is made by a filament winding method (hereinafter referred to as "FW method"). The FW method includes a process of forming a fiber reinforced plastics (FRP) layer around a substantially ellipse liner (inner container). In this process, fibers impregnated with thermosetting resins are usually wound around the liner.

In the FW method, hoop winding and helical winding are both performed. In the hoop winding, the FRPs are wound around a tank perpendicular to the tank axis. In the helical winding, the FRPs are wound around the tank obliquely to the tank axis. The hoop winding and the helical winding are alternately performed at predetermined times, and fiber reinforced plastics layers are formed around a circumference surface of the gas tank.

The helical winding of the FW method includes a multi-yarn feeding method, in which a large number of fibers are simultaneously wound around a liner from multiple directions. This multi-yarn feeding method significantly reduces the time taken to wind fibers around a liner.

In the multi-yarn feeding method, a helical winding head is used. The helical winding head feeds a large number of fibers to a gas tank from a plurality of positions on a concentric circle around the gas tank. While the rotating gas tank relatively reciprocates in the tank axial direction to the helical winding head, a plurality of fibers are fed from the helical winding head to the gas tank. In this way, the helical winding is performed on the gas tank.

Meanwhile, at the end of the helical winding, trailing ends of a large number of fibers need to be fastened to the gas tank. As a method for fastening the trailing ends, the following methods have already been proposed: a method for twisting the trailing ends of fibers around mouthpieces positioned at both ends of a gas tank or a method for securing the trailing ends of fibers with a resin clip to the gas tank.

SUMMARY OF THE INVENTION

In the method for twisting trailing ends of fibers around a mouthpiece of a gas tank, however, as a large number of fibers are wound intensively around the mouthpiece, the length of the mouthpiece needs to be long in the tank axial direction. Further, the trailing ends of the fibers after the twisting need to be fastened, which is a troublesome job.

In the method for fastening trailing ends of fibers with a resin clip to a gas tank, each trailing end of one hundred (100) or more fibers needs to be fastened one by one, and then the operation needs to be confirmed. These operations are complicated and take time.

According to the present invention, the helical winding with the multi-yarn feeding method facilitates the operation to fasten fiber trailing ends to a gas tank.

One aspect of the present invention is a filament winding method for winding fibers around a tank. The tank is composed of a trunk portion and a pair of domed portions. The trunk portion has a uniform radius in a tank axial direction. Each of the domed portions communicates with a corresponding end portion of the trunk portion in the tank axial direction and is formed with a diameter that becomes smaller outward in the tank axial direction. The helical winding head has a plurality of yarn-feeding sections arranged on a concentric circle around the tank. While the rotating tank relatively reciprocates in the tank axial direction to the helical winding head, fibers are fed from each yarn-feeding section to the tank. After the tank turns back in the tank axial direction, a large number of fibers are wound around one of the domed portions and the trunk portion of the tank, and trailing ends of the large number of fibers are located at one end portion of the trunk portion. Then, a rotating hoop winding head feeds a piece or a small number of fibers to the trunk portion, and hoop winding is performed on helical winding layers formed around the trunk portion. Then, at the one end portion of the trunk portion, trailing ends of the large number of fibers pulled from the yarn-feeding sections of the helical winding head are cut off.

Another aspect of the present invention is a filament winding apparatus. The filament winding apparatus winds fibers around a tank. The tank is composed of a trunk portion and a pair of domed portions. The trunk portion has a uniform radius in a tank axial direction. Each of the domed portions communicates with a corresponding end portion of the trunk portion in the tank axial direction and is formed with a diameter that becomes smaller outward in the tank axial direction. The filament winding apparatus includes a helical winding head, a hoop winding head, a first moving device, a second moving device and a controlling device. The helical winding head has a plurality of yarn-feeding sections arranged on a concentric circle around the tank, each of which feeds fibers to the tank. The hoop winding head feeds fibers to the tank. The first moving device relatively moves the tank in the tank axial direction to the helical winding head. The second moving device relatively moves the hoop winding head in the tank axial direction to the tank. The controlling device controls movements of the first and the second moving devices and helical and hoop winding heads. While a rotating tank relatively reciprocates in the tank axial direction to the helical winding head, a fiber is fed from each yarn-feeding section to the tank. After the tank turns back in the tank axial direction, a large number of fibers are wound around one of the domed portions and the trunk portion, and trailing ends of the large number of fibers are located at one end portion of the trunk portion. Then, a piece or a small number of fibers are fed from the rotating hoop winding head to the trunk portion, and hoop winding is performed over helical winding layers formed around the trunk portion. Then, at the one end portion of the trunk portion, trailing ends of the large number of fibers pulled from the yarn-feeding sections of the helical winding head are cut off.

Yet another aspect of the present invention is a tank whose outer circumference surface is wound with fibers. The tank is composed of a trunk portion and a pair of domed portions. The trunk portion has a uniform radius in a tank axial direction. Each of the domed portions communicates with a corresponding end portion of the trunk portion in the tank axial direction and is formed with a diameter that becomes smaller outward in the tank axial direction. The outermost layer of a large number of fibers wound with the helical winding is formed on one of the domed portions and the trunk portion. Trailing ends of the large number of fibers are located at one end portion of the trunk portion. A hoop winding layer is formed around the outermost helical winding layer formed around the trunk portion. Cut edges of the large number of fibers wound with the helical winding are located at the one end portion of the trunk portion.

According to the above-described aspects of the invention, as the trailing ends of the large number of fibers wound with the helical winding are fastened at once with the hoop winding, it is easy to fasten the trailing ends of the large number of fibers.

Other features, elements, processes, steps, characteristics and advantages of the present invention will become more apparent from the following detailed description of embodiments of the present invention with reference to the attached drawings.

DETAILED DESCRIPTION OF EMBODIMENTS OF THE INVENTION

Figure 1:
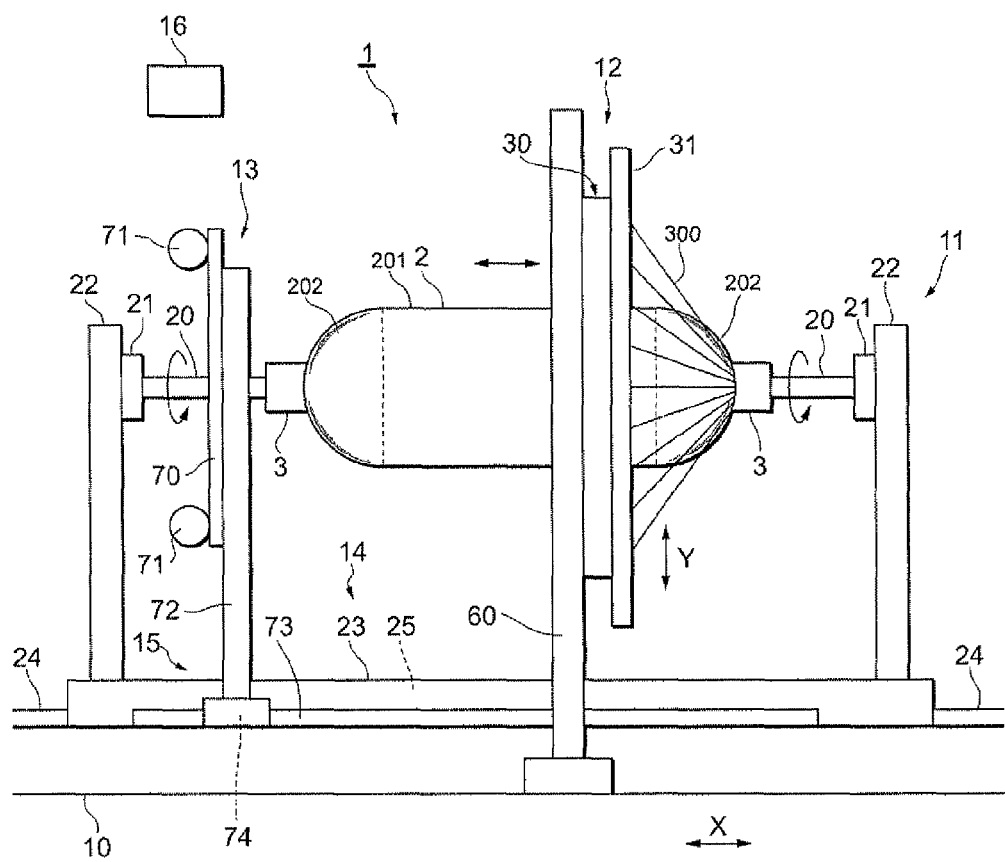
FIG. 1 is a schematic view illustrating a filament winding apparatus according to an embodiment of the present invention.

An embodiment of the present invention will be described with reference to the drawings. FIG. 1 is a schematic view illustrating a filament winding apparatus (hereinafter referred to as "FW apparatus") 1 in accordance with an embodiment of the present invention.

The FW apparatus 1 includes a base 10, a tank supporting unit 11, a helical winding head 12, a hoop winding head 13, a first moving device 14, a second moving device 15 and a controlling device 16. The tank supporting unit 11 is arranged on the base 10 to be capable of moving in the tank axial direction, and supports a gas tank 2 to be capable of rotating. The helical winding head 12 is fixedly attached on the base 10 in the tank axial direction, and performs helical winding on a circumference surface of the gas tank 2 by simultaneously feeding a large number of fibers 300 to the gas tank 2 supported with the tank supporting unit 11. The hoop winding head 13 is arranged on the base 10 to be capable of moving in the tank axial direction, is capable of rotating, and performs hoop winding on the circumference surface of the gas tank 2 by simultaneously feeding a piece or a small number of fibers 300 to the gas tank 2. The first moving device 14 reciprocates the tank supporting unit 11 in the tank axial direction X, and relatively moves the gas tank 2 in the tank axial direction X to the helical winding head 12. The second moving device 15 reciprocates the hoop winding head 13 in the tank axial direction X, and relatively moves the hoop winding head 13 in the tank axial direction X to the static gas tank 2 supported with the tank supporting unit 11. The controlling device 16 controls movements of these devices and units.

The tank supporting unit 11 includes a pair of shafts 20, a pair of chucks 21, a pair of supporting columns 22, and a moving base 23. Each of the chucks 21 is structured to be capable of coupling with a mouthpiece 3 provided at each end portion of the gas tank 2. Each of the chucks 21 holds an outward end portion of each shaft 20. Each of the supporting columns 22 holds each of the supporting columns 21. The paired supporting columns 22 are fixedly attached on the moving base 23 which moves in the tank axial direction X to the base 10. The paired chucks 21 are provided with a rotation drive source which rotates the gas tank 2 by rotating the shafts 20. A rail 24 is arranged on the base 10 along with the tank axial direction X. The moving base 23 is arranged on the rail 24, and reciprocates along the rail 24 with a drive source 25. The drive source 25 is, for example, an electric motor. With this configuration, the gas tank 2 supported with the paired shafts 20 reciprocates in the tank axial direction X. In a present embodiment, the first moving device 14 is composed of the moving base 23, the rail 24 and the drive source 25.

Figure 2:
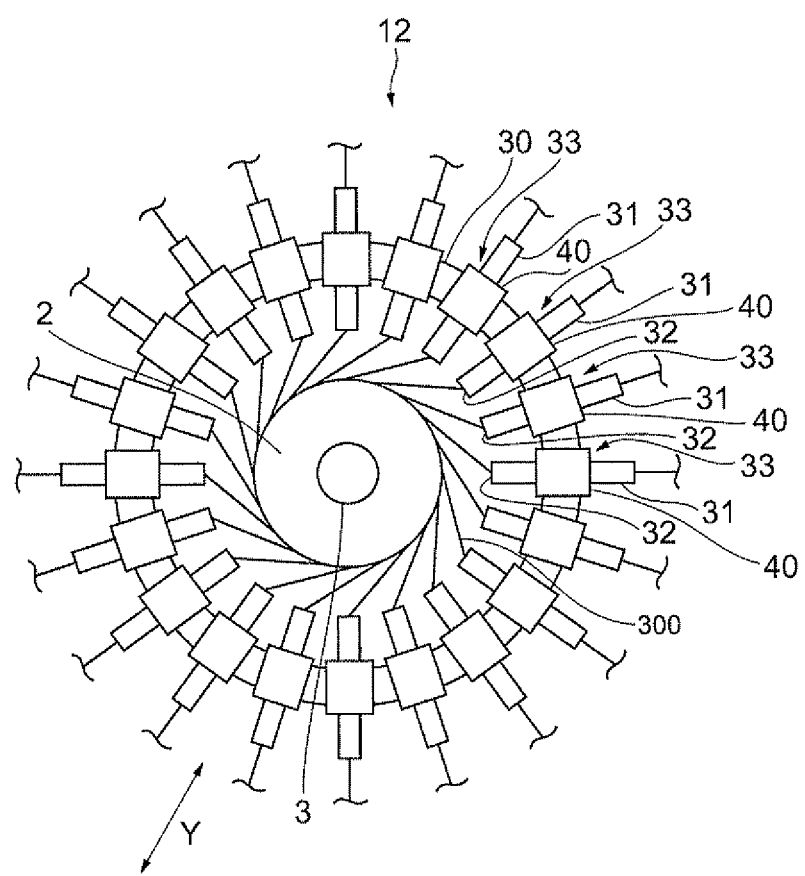
FIG. 2 is a front view schematically illustrating a helical winding head.

The helical winding head 12 includes a guide ring 30, guide tubes 31 as a multi-yarn-feeding section, and yarn-feeding port moving devices 33. As illustrated in FIG. 2, the guide ring 30 is a perfect circle, and is arranged around the gas tank 2 so as to have the same center as the tank axis. A plurality of guide tubes 31 are arranged in a concyclic manner at equal intervals on the guide ring 30, and each guide tube 31 feeds a piece of FRP 300 to the gas tank 2. The yarn-feeding port moving devices 33 move yarn-feeding ports 32 of all guide tubes 31 in the direction Y in which the yarn-feeding ports 32 move away from and approach the tank axial center.

Each guide tube 31, whose yarn-feeding port 32 faces toward the axial center of the gas tank 2, is arranged in a radial manner. Tube holders 40 fix the guide tubes 31 to the guide ring 30. A piece of fiber 300 is inserted into each guide tube 31 from the outside toward the tank axial center, and is pulled from the yarn-feeding port 32 at the edge of the guide tube 31 in the side of the gas tank 2.

The yarn-feeding port moving device 33 may be composed of, for example, a gear mechanism and its drive source.

A supporting member 60 is fixedly attached to the base 10, and the plurality of guide tubes 31 are supported with the supporting member 60 via the guide rings 30.

The hoop winding head 13 includes a rotation ring 70, which is capable of rotating, and one or a small number of yarn-feeding section(s) 71 (a small number of yarn-feeding sections in an embodiment indicated in FIG. 1). The gas tank 2 is capable of coaxially coming into/out from a hollow portion of the rotation ring 70. The hoop winding head 13 is supported with a supporting member 72. A rail 73 is attached on the base 10 along with the tank axial direction X, and a drive source 74, such as a motor, reciprocates the supporting member 72 on the rail 73 in the tank axial direction X. In a present embodiment, the second moving device 15 is composed of the supporting member 72, the rail 73 and the drive source 74.

The controlling device 16 controls movements of, at least, the helical winding head 12, the hoop winding head 13, the first and the second moving devices 14, 15 in accordance with, for example, a program stored in a storage section, and thus the FW method, which is described later, is executed on the gas tank 2.

An FW method using the FW apparatus 1 will be described below.

As illustrated in FIG. 1, the gas tank 2 is supported with the tank supporting unit 11, which allows the gas tank 2 to rotate and reciprocate in the tank axial direction X. The hoop winding and the helical winding are alternately performed for the gas tank 2 at predetermined times, and FRP layers are formed on a circumference surface of the gas tank 2.

In a step of the hoop winding, while each yarn-feeding section 71 feeds a piece of fiber 300 to the gas tank 2 in conjunction with rotation of the rotation ring 70 of the hoop winding head 13 around the tank axial center, the hoop winding head 13 reciprocates in the tank axial direction X between both ends of the trunk portion 201 at a low speed. In this way, the fibers 300 are wound around the trunk portion 201 of the gas tank 2 with the hoop winding.

In a step of the helical winding, while the gas tank 2, which is rotating upon the tank axis, reciprocates in the tank axial direction X at a high speed to the helical winding head 12 between the mouthpieces 3 arranged at both ends of the gas tank 2, a piece of fiber 300 is fed from each guide tube 31 of the helical winding head 12. Accordingly, a large number of fibers 300 are simultaneously wound around the whole portion of the gas tank 2 (trunk portion 201 and domed portions 202) with the helical winding.

A method for fastening fiber trailing ends to the gas tank 2 with the helical winding of the FW method according to the present invention is described below.

Figure 3A:
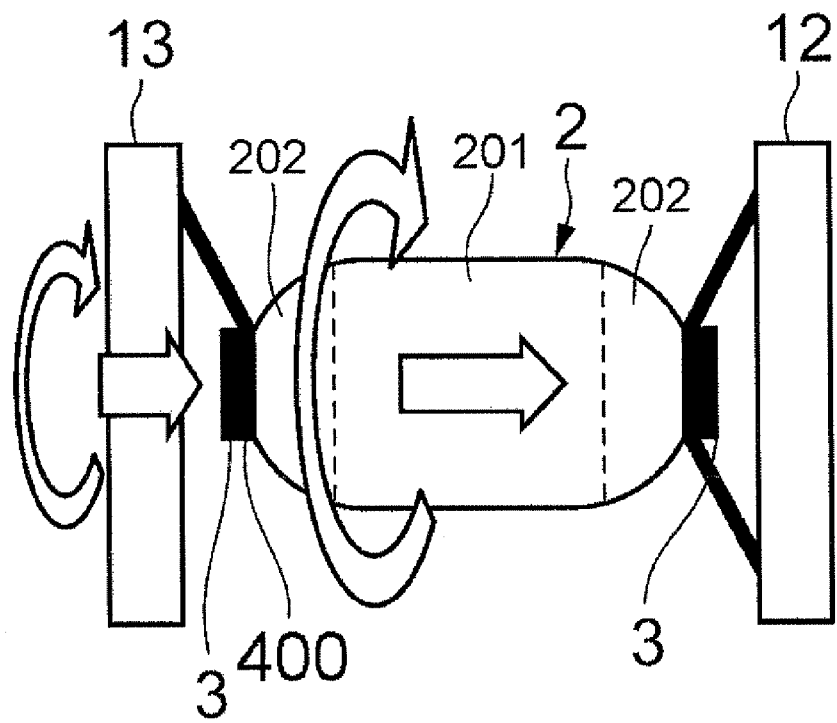
FIGS. 3A to 3E are views describing operations of a gas tank, a hoop winding head, and a helical winding head in each process.

As illustrated in FIG. 3A, the gas tank 2 and the hoop winding head 13 move at an equal speed in the tank axial direction X to the side of the helical winding head 12 (rightward in FIG. 3A) while synchronously rotating at an equal angular velocity. Then, when the gas tank 2 is passing through the hollow portion of the helical winding head 12, a large number of fibers 300 are wound around the gas tank 2. Note that, as the helical winding head 12 is fixedly attached, it is incapable of moving.

Figure 3B:
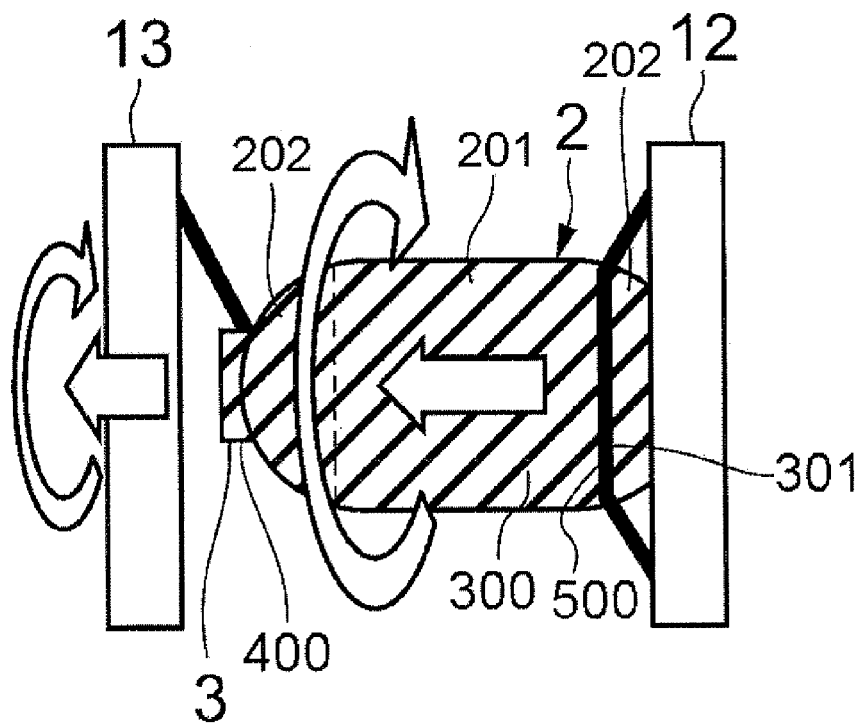

Then, once the large number of fibers 300 are wound to the one end portion 400 of the gas tank 2 (left end in FIG. 3B), the gas tank 2 and the hoop winding head 13 turn back (going around in the tank axial direction) and move in the direction in which the gas tank 2 moves away from the helical winding head 12 (leftward in FIG. 3B). At this time, as the gas tank 2 and the hoop winding head 13 continue to synchronously rotate at equal angular velocity, the large number of fibers 300 are pulled from the helical winding head 12 and are wound around the gas tank 2. Then, the large number of fibers 300 are wound in this order from the one end portion 400 of the gas tank 2 through the one domed portion 202 (left domed portion 202 in FIG. 3B) and the trunk portion 201. Then, rotation and movement in the tank axial direction of the gas tank 2 are stopped, and feeding of the large number of fibers 300 from the helical winding head 12 is also stopped. In this way, at the outermost layer of the helical winding, the large number of fibers 300 are wound around only one domed portion 202 (left side in FIG. 3B) and the trunk portion 201, and the trailing ends of all fibers 300 are located at the other end portion 500 of the trunk portion 201.

Figure 3C:
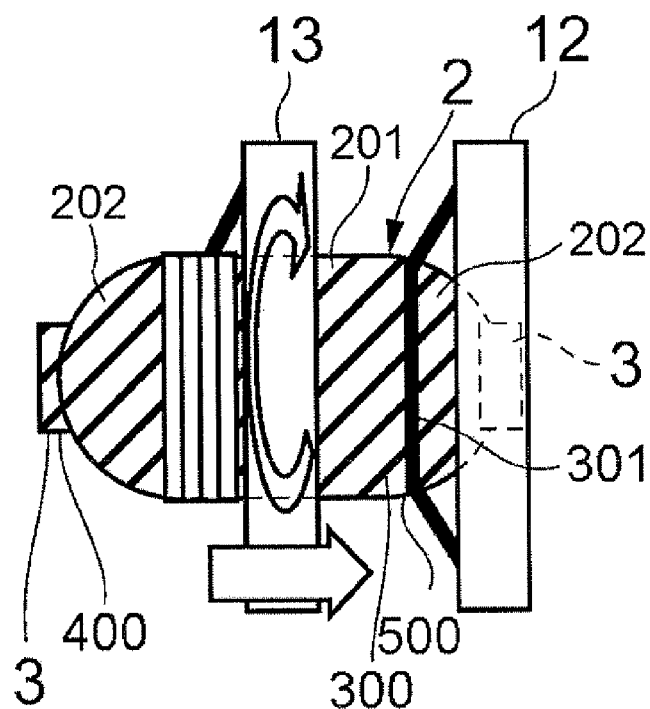
Figure 3D:
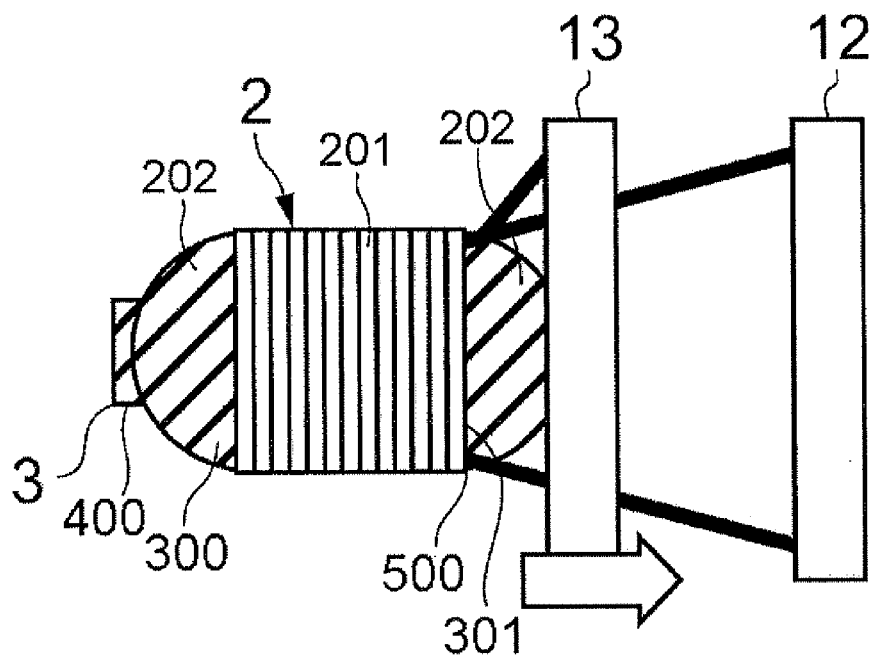

Then, while rotation and movement in the tank axial direction X are stopped, the hoop winding head 13 moves in the tank axial direction X to the side of the helical winding head 12 (rightward in FIG. 3C) while rotating, a small number of fibers 300 are wound around the trunk portion 201 of the gas tank 2. Once the small number of fibers 300 are wound around to the other end portion 500 of the trunk portion 201, rotation and movement of the hoop winding head 13 are stopped, and feeding of the small number of fibers 300 from the hoop winding head 13 is also stopped. Fiber trailing ends of a hoop winding layer are fastened to the gas tank 2. Methods for fastening fiber trailing ends include bonding by thermo compression bonding and with adhesive, and folding trailing ends into a fiber of an inner layer. In this way, as illustrated in FIG. 3D, hoop winding layers are formed on the outermost helical winding layer of the trunk portion 201, and the hoop winding layers press the trailing ends of the large number of fibers 300 wound with the helical winding against the gas tank 2. Alternatively, the hoop winding head 13 may form multi hoop winding layers on the fibers 300 wound with the helical winding by reciprocating along the trunk portion 201 one or more times. After feeding of a small number of fibers 300 is stopped, the hoop winding head 13 moves further to the side of the helical winding head 12 (rightward in FIG. 3D). Also, the gas tank 2 moves in the direction in which the gas tank 2 moves away from the helical winding head 12 (leftward in FIG. 3D) and moves away from each hollow portion of the hoop winding head 13 and the helical winding head 12.

Figure 3E:
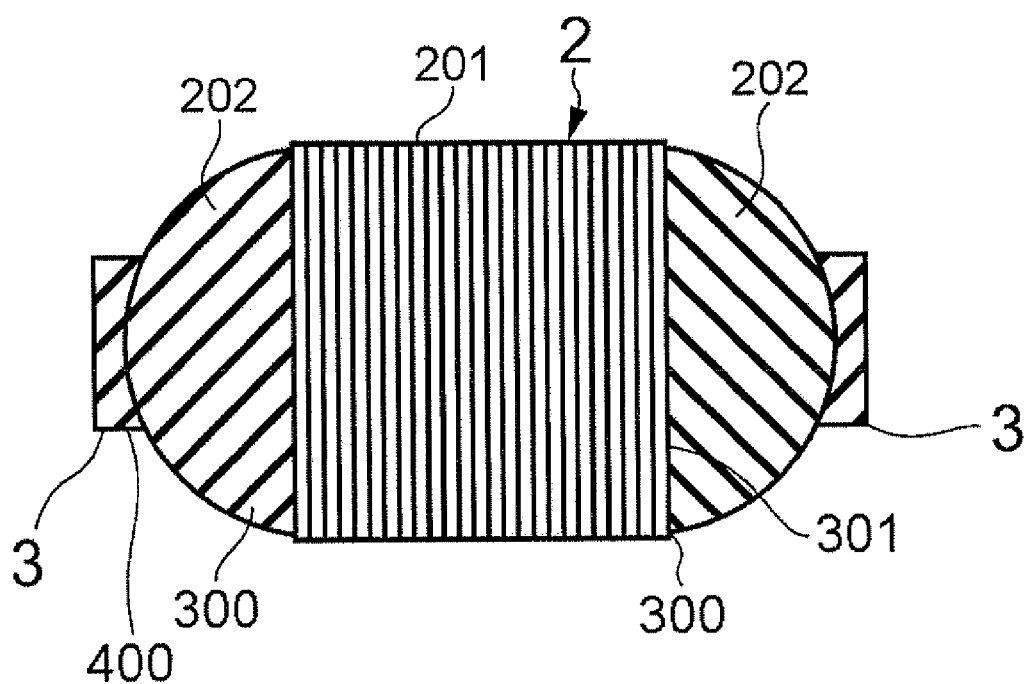

Next, as illustrated in FIG. 3E, the fibers 300 pulled from the helical winding head 12 are all cut off at the end portion 500 on the other side of the trunk portion 201 where the trailing ends of the large number of fibers 300 are located. Then, all fibers 300 pulled from the hoop winding head 13 are also cut off.

According to the embodiment of the present invention, hoop winding layers fasten the fiber trailing ends of the large number of fibers 300 wound with the helical winding at once. Thus, in the multi-yarn feeding method, it becomes easy to fasten the fiber trailing ends wound with the helical winding, which eventually reduces the time taken to fasten fiber trailing ends wound with the helical winding. Helical winding is performed to the other end portion 500 of the trunk portion 201, and as hoop winding is performed over the entire length of the trunk portion 201, the trailing ends of the fibers 300 wound with the helical winding are fastened firmly. Further, it becomes possible to visually confirm the trailing ends of the fibers 300 wound with the helical winding.

Embodiments of the present invention have been described with reference to attached drawings. However, the present invention is not limited to these embodiments.

In the embodiments described above, the gas tank 2 moves in the tank axial direction X during a helical winding operation. However, the helical winding head 12 may move in the tank axial direction X. Further, in the embodiments described above, the hoop winding head 13 moves in the tank axial direction X during a hoop winding operation. However, the gas tank 2 may move in the tank axial direction X.

The FW apparatus 1 and the FW method in accordance with the present embodiments can be applied not only to manufacturing of tanks used in fuel-cell power vehicles but also manufacturing of tanks used in other types of vehicles, such as electric automobiles or hybrid automobiles, various transporting vehicles, such as vessels, air planes, or robots, and fixed buildings, such as a residence and a building.

While the present invention has been described with respect to embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. A filament winding method for winding fibers around a tank composed of a trunk portion having a uniform radius in a tank axial direction and a pair of domed portions, wherein each of the domed portions communicates with a corresponding end portion of the trunk portion in the tank axial direction and is formed with a diameter that becomes smaller outward in the tank axial direction, comprising the steps of:

a first step wherein while the tank, which is rotating, relatively reciprocates in the tank axial direction to a helical winding head, fibers are fed from each of a plurality of yarn-feeding sections to the tank, wherein the helical winding head includes the plurality of yarn-feeding sections arranged on a concentric circle around the tank;

a second step wherein after the tank lastly turns back in the tank axial direction, a large number of fibers are wound around only one of the domed portions and the trunk portion of the tank at the outermost layer of the helical winding, trailing ends of the large number of fibers are located at one end portion of the trunk portion, and feeding of the large number of fibers from the helical winding head is stopped; and a third step wherein after the second step, a small number of fibers are fed from a rotating hoop winding head to the trunk portion, hoop winding is performed on the outermost helical winding layer formed around to the other end portion of the trunk portion, and feeding of the small number of fibers from the hoop winding head is stopped, and then at the one end portion of the trunk portion, the large number of fibers pulled from the yarn-feeding sections of the helical winding head are cut off.

\* \* \* \* \*